(12) United States Patent
Agarwal et al.

(10) Patent No.: US 8,788,272 B2
(45) Date of Patent: Jul. 22, 2014

(54) SYSTEMS AND METHODS FOR EDITING TELECOM WEB APPLICATIONS THROUGH A VOICE INTERFACE

(75) Inventors: Sheetal K. Agarwal, Maharashtra (IN); Arun Kumar, Tamil Nadu (IN); Priyanka Manwani, Noida (IN)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/948,449

(22) Filed: Nov. 17, 2010

(65) Prior Publication Data

US 2012/0123783 A1 May 17, 2012

(51) Int. Cl.
*G10L 15/22* (2006.01)

(52) U.S. Cl.
USPC ........ 704/275; 704/270; 704/270.1; 704/278; 379/93.01

(58) Field of Classification Search
USPC ............. 704/270, 275, 270.1, 278; 379/93.01
See application file for complete search history.

(56) References Cited

U.S. PATENT DOCUMENTS

| | | | |
|---|---|---|---|
| 4,582,441 A | 4/1986 | Carter et al. | |
| 5,875,429 A | 2/1999 | Douglas | |
| 5,875,448 A | 2/1999 | Boys et al. | |
| 5,945,989 A | 8/1999 | Freishtat et al. | |
| 6,026,433 A | 2/2000 | D'Archlach et al. | |
| 6,604,075 B1 | 8/2003 | Brown et al. | |
| 6,895,084 B1 | 5/2005 | Saylor et al. | |
| 6,996,609 B2 * | 2/2006 | Hickman et al. | 709/218 |
| 7,334,050 B2 | 2/2008 | Zondervan et al. | |
| 2001/0008555 A1 * | 7/2001 | Bae et al. | 379/88.13 |
| 2002/0080927 A1 | 6/2002 | Uppaluru | |
| 2002/0122541 A1 * | 9/2002 | Metcalf | 379/88.02 |
| 2002/0146015 A1 | 10/2002 | Bryan et al. | |
| 2008/0319760 A1 | 12/2008 | DaPalma et al. | |
| 2009/0138262 A1 | 5/2009 | Agarwal et al. | |
| 2009/0238348 A1 | 9/2009 | Agarwal et al. | |
| 2009/0259970 A1 | 10/2009 | Hawkins | |

OTHER PUBLICATIONS

Using Dreamweaver, A Dreamweaver MX 2004 user manual, 2004, 786 pages, Macromedia, San Francisco, California, USA.
Kumar, Arun, et al., "VOISERV: Creation and Delivery of Converged Services Through Voice for Emerging Economies", available at http://domino.research.ibm.com/comm/research_people.nsf/pages/arun_kumar.pubs.html/$FILE/VOISERV-IEEE-WowMom2007.pdf, as of Jun. 30, 2010.
Kumar, Arun et al., The Spoken Web Application Framework User Generated Content and Service Creation Through Low-End Mobiles, W4A2010—Technical, Apr. 26-27, 2010, Raleigh, North Carolina, available at Uhttp://portal.acm.org/citation.cfm?id=1805990&dl=GUIDE&coll=GUIDE&CFID=92758746&CFTOKEN=63353195, as of Jun. 30, 2010.

* cited by examiner

*Primary Examiner* — Jialong He
(74) *Attorney, Agent, or Firm* — Ference & Associates LLC

(57) ABSTRACT

Systems and associated methods for editing telecom web applications through a voice interface are described. Systems and methods provide for editing telecom web applications over a connection, as for example accessed via a standard phone, using speech and/or DTMF inputs. The voice based editing includes exposing an editing interface to a user for a telecom web application that is editable, dynamically generating a voice-based interface for a given user for accomplishing editing tasks, and modifying the telecom web application to reflect the editing commands entered by the user.

10 Claims, 8 Drawing Sheets

SYSTEMS AND METHODS FOR EDITING TELECOM WEB APPLICATIONS THROUGH A VOICE INTERFACE

BACKGROUND

Content creation and access in the developing world is mostly focused on audio content. There are various reasons for this, such as to account for low literacy rates among certain groups of users, to accommodate use of simple/standard devices (for example, voice-only phones), and the like. One clear example of this is the development of the World Wide Telecom Web (WWTW) (Telecom Web or alternately, the Spoken Web). The WWTW is a web of VoiceSites that contain information in audio, and can be accessed by a regular/standard phone.

BRIEF SUMMARY

Systems and associated methods for editing telecom web applications through a voice interface are described. Systems and methods provide for editing telecom web applications over a connection such as a voice channel, as for example accessed via a standard phone, using speech and/or DTMF inputs. The voice based editing includes exposing an editing interface to a user for a telecom web application that is editable, dynamically generating a voice-based interface for a given user for accomplishing editing tasks, and modifying the telecom web application to reflect the editing commands entered by the user.

In summary, one aspect provides a method for editing telecom web applications through a voice-based editing interface comprising: presenting a voice-based editing interface for a telecom web application to a user over a voice channel; dynamically generating the voice-based editing interface for a user responsive to at least one user input; and modifying at least one aspect of the telecom web application responsive to at least one user editing input to the voice-based editing interface.

Another aspect provides a computer program product for editing telecom web applications through a voice-based editing interface comprising: a computer readable storage medium having computer readable program code embodied therewith, the computer readable program code comprising: computer readable program code configured to present a voice-based editing interface for a telecom web application to a user over a voice channel; computer readable program code configured to dynamically generate the voice-based editing interface for a user responsive to at least one user input; and computer readable program code configured to modify at least one aspect of the telecom web application responsive to at least one user editing input to the voice-based editing interface.

A further aspect provides a system for editing telecom web applications through a voice-based editing interface comprising: at least one processor; and a memory operatively connected to the at least one processor; wherein, responsive to execution of computer readable program code accessible to the at least one processor, the at least one processor is configured to: present a voice-based editing interface for a telecom web application to a user over a voice channel; dynamically generate the voice-based editing interface for a user responsive to at least one user input; and modify at least one aspect of the telecom web application responsive to at least one user editing input to the voice-based editing interface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The description now turns to the figures. The illustrated example embodiments will be best understood by reference to the figures. The following description is intended only by way of example and simply illustrates certain example embodiments representative of the invention, as claimed. First, a short contextual description of the WWTW is provided in order to formulate the problems addressed by embodiments.

Figure 1A:
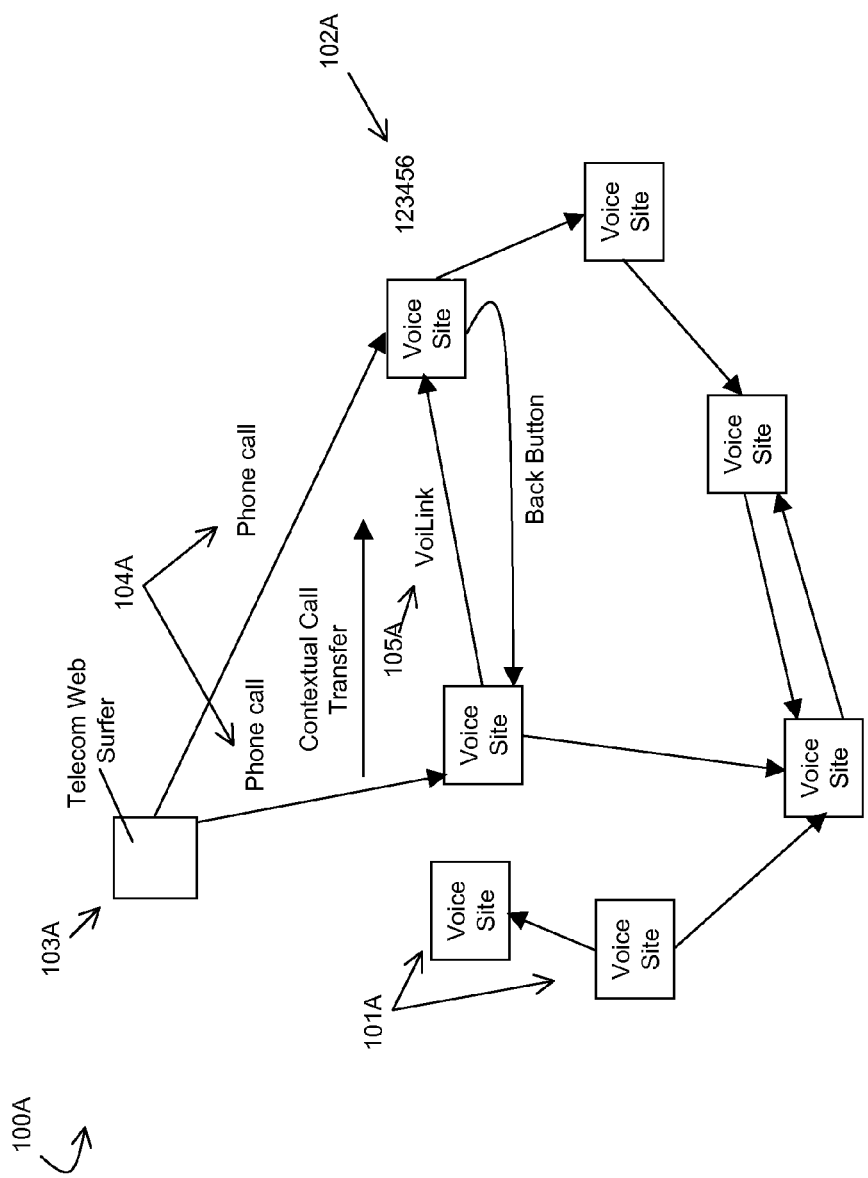
FIG. 1(A-B) illustrates an example view of the Telecom Web and VoiceSite generation.

Referring to FIG. 1A and using the Spoken Web 100A as a non-limiting use context, VoiceSites 101A (the reference numeral 101A is used to refer to VoiceSites generally, both singular and plural) are voice-driven applications that are hosted in the telecom network. VoiceSites 101A are addressed by a unique phone number 102A and can be accessed from any phone instrument 103A (mobile or landline) through an ordinary phone call 104A to a given VoiceSite 101A number 102A. Thus, accessing a VoiceSite 101A does not require any extra software to be installed on the client device 103A (phone). VoiceSites 101A are therefore analogous to web sites of the World Wide Web (WWW), but can be accessed by dialing a phone number 102A using a phone 103A rather than entering a URL into a web browser of a computing device, and information can be heard rather than being seen/read. A VoiceSite 101 is formed by one or more VoicePages (for example VoiceXML files) that are hosted and co-located in the telecom web infrastructure.

Creation of a VoiceSite 101A is made easy by systems such as the VoiGen system (described in detail elsewhere), to which anyone can call and interact with through voice. Such a system enables any person that can communicate using speech to create his/her own VoiceSite 101A. Such a system also enables easy local audio-content creation. A VoiceSite 101A can link 105A to other VoiceSites 101A through Hyperspeech Transfer Protocol (HSTP). Such interconnected VoiceSites 101A result in a network referred to as the WWTW (Telecom Web) or the Spoken Web 100A.

Subscribers can thus expose custom information and services through the VoiceSites 101A. For example, individual users and enterprises can set up personal and/or business VoiceSites, much the same as they can set up web sites. Those having ordinary skill in the art will thus understand that VoiceSites include re-usable software components.

Figure 1B:
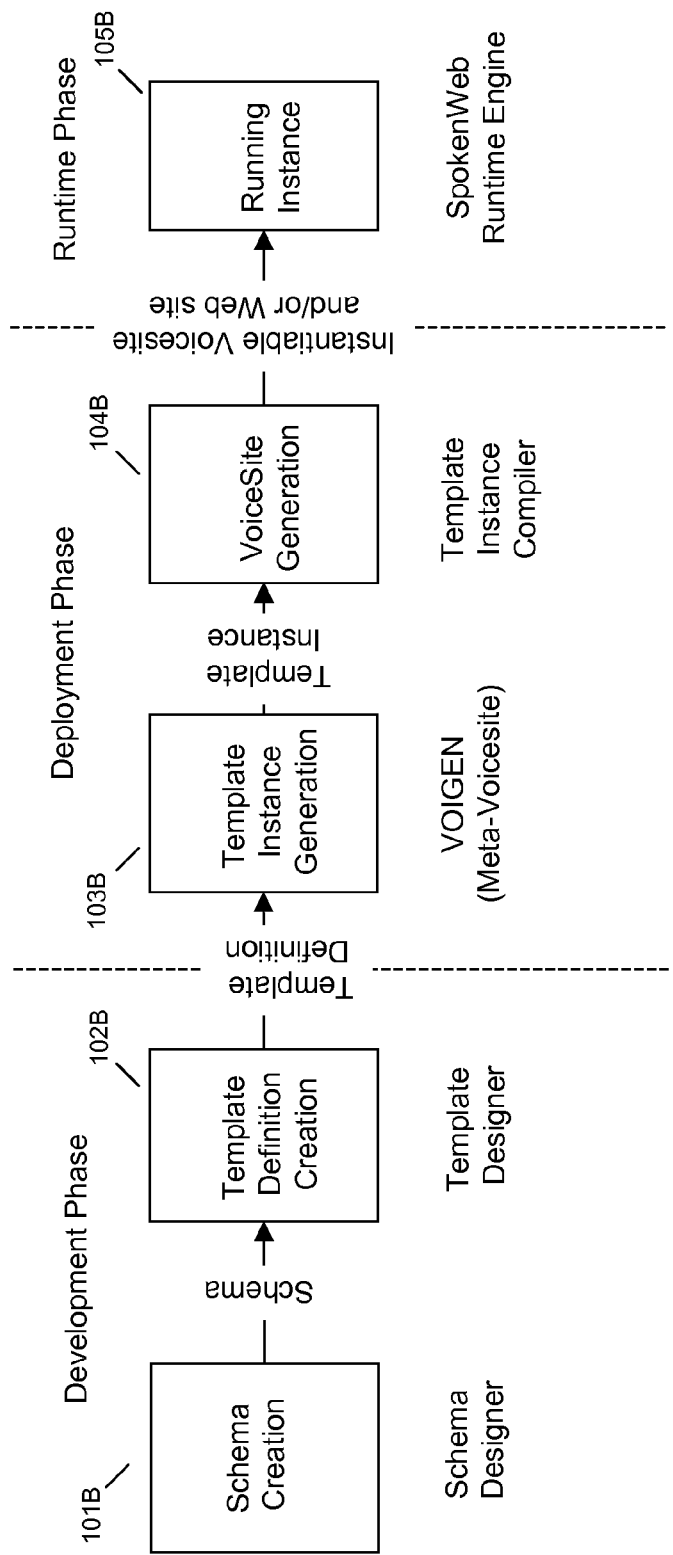

FIG. 1B illustrates a high level flow of VoiceSite creation. By way of useful contextual information, the Spoken Web Application Framework (SWAF) is an application framework for rapid development and deployment of VoiceSites. The SWAF supports voice over telephony as the primary interface for creation of VoiceSites to support users in addition to supporting APIs and GUIs for the developers. The SWAF enables creation of meta-applications (that is, the creator of other applications) as well, and follows a principled, four-stage approach to perform the entire development process in a systematic and structured manner.

The process essentially consists of four stages that populate two phases prior to deployment of a VoiceSite in a runtime phase. During a development phase, schema creation 101B by a schema designer allows for template definition creation 102B by a template designer. The schema is created in any acceptable language, such as XML. Once template definition creation 102B has been completed, the template definitions are used in a deployment phase for template instance generation 103b and VoiceSite generation 104B.

The template definitions define a template instance for a VoiceSite. Template definition is customized to select desired components for the VoiceSite. The selected components are configured to exhibit the desired behavior. Thus, a VoiceSite includes a customized version of a template. A user interface is generated with prompts and grammar for the internal nodes (VoicePages) of the application tree (that is, a VoiceSite can be thought of as a tree, with nodes being VoicePages and links between VoicePages being voice links (also referred to as "VoiLinks")). Labels are provided by the user during the component selection used to generate the grammar. In a voice user interface, labels are chosen by the user from a list of pre-defined labels for a component and used to generate the grammar. In the case of a web user interface, an arbitrary label can be specified. For application generation, the template instance, user interface files generated, binding files and configuration files are used to create an executable voice application that is ready to be deployed. Once a VoiceSite has been generated, a running instance 105B is created, which is the fully developed VoiceSite, for example hosted on a server and accessible by users over a voice channel.

Once created, however, a VoiceSite may need editing to provide appropriate updates, customizations, and the like, as with a web site. Thus, a problem arises in providing users with an ability to edit VoiceSites through a voice interface over a phone call. The provisioning of a voice interface is needed because the owners of these VoiceSites may for example be low-literate users or users having access to lower end devices, such as standard, voice-only phones.

Figure 2:
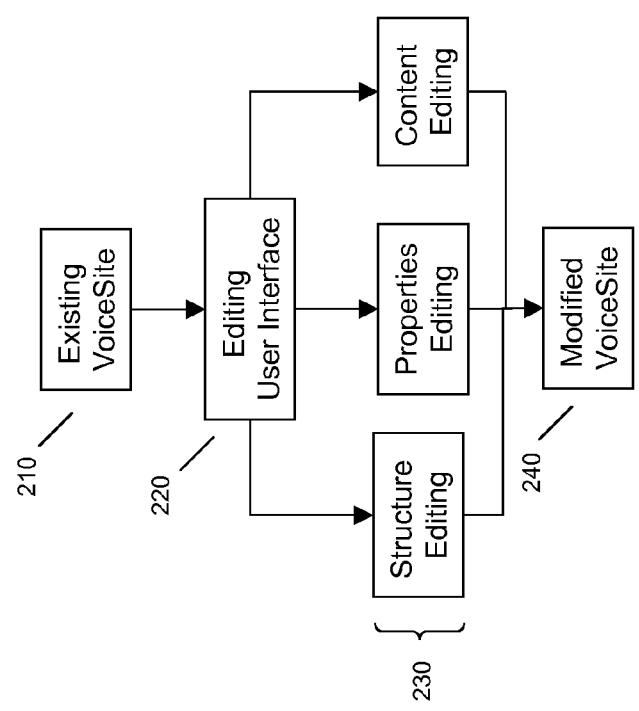
FIG. 2 illustrates an example of VoiceSite editing.

Embodiments are configured to provide a convenient user interface for editing a VoiceSite. As illustrated in FIG. 2, essentially three types or categories of editing activities are enabled by embodiments. Given an existing VoiceSite 210, a user can access an editing user interface 220, such as a voice-based editing user interface (VUI). Once the user is authenticated, he or she may perform a variety of editing activities 230. The editing activities include structural editing that reorganizes one or more structural elements of the VoiceSite, properties editing that reconfigures one or more properties of the VoiceSite or components thereof, and content editing that modifies the audio content of the VoiceSite. Once the user has finished editing, the modified VoiceSite 240, including the edits made, is saved and made available as the existing VoiceSite 210 was.

Figure 3:
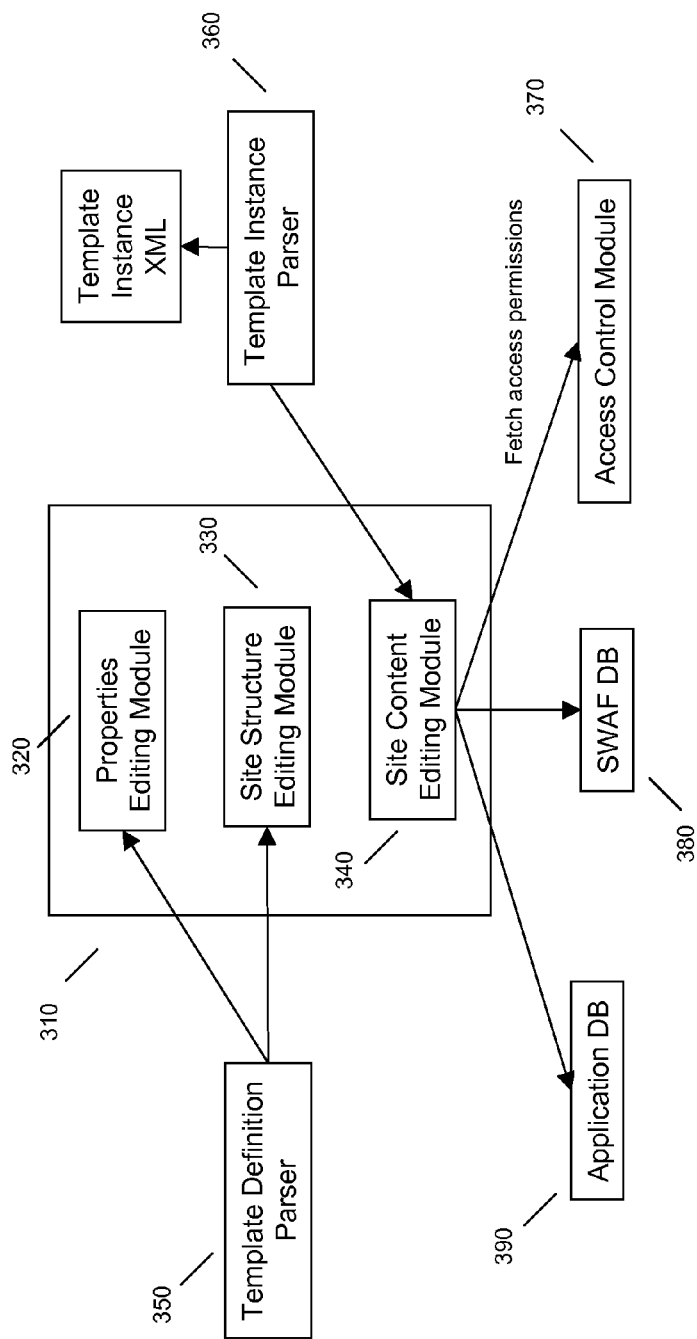
FIG. 3 illustrates an example system for VoiceSite editing.

FIG. 3 illustrates a system for VoiceSite editing. Embodiments provide voice based access to voice applications, for example over a phone call. Thus, users can edit the VoiceSite over a voice channel. Embodiments are configured to expose a VoiceSite VUI for editing purposes. The VUI can be integrated with an access control component of the VoiceSite in order to control selectively the enabling and disabling of editing functions for the editable components. Thus, embodiments dynamically generate a VUI to enable editing over the phone.

The system includes an editing module 310 accessed via a VUI that enables three basic types of editing functions. Site structure editing module 330 enables changing the call flow of the site by adding new components, removing and/or deactivating existing components, and reordering the rendering of the components, and the like. A properties editing module 320 enables reconfiguration of properties associated with the VoiceSite as a whole (for example, preferred language(s)) and/or voice site components (for example, properties relating to user generated content of a particular VoicePage). A site content editing module 340 enables editing of user generated content posted on the VoiceSite. This includes for example moderation of and/or adding/deleting of audio content.

Thus, the editing module 310 is composed of properties editing module 320, site structure editing module 330, and site content editing module 340. As a presently preferred example, the site content editing module 340 is initiated from the template instance parser 360. The site structure editing module 330 and the properties editing module 320 are initiated from the template definition parser 350. As another example, all of the editing modules 320, 330, and 340, can be invoked through the meta-VoiceSite (for the owner of the VoiceSite) as well as the running instance of the VoiceSite (for the owner of the VoiceSite or others having required permissions, such as subscribers).

The editing module 310 uses the access control module 370 for determining the level of editing permissions available to the logged-in user. Thus, the VUI can be dynamically generated per user. Typically, a VoiceSite owner may have all three kinds of editing permissions. A site administrator may have user content editing and content editing permissions for some or all of the components. An end caller (not the owner) may have content editing and properties permissions for some content (for example, as populated by the end user).

Based upon the permissions and editing operation requested, the corresponding parser (350 or 360) presents the appropriate editing VUI to the user in question while this user navigates the meta-VoiceSite or the running instance of the VoiceSite, depending on the stage of development for the given use context. The editing module 310 thus implements a flow wherein the user can listen to the current values for content, properties and/or structure. If the user decides that a particular editing function is desirable, he or she can utilize the VUI to invoke the editing modules 320, 330 and/or 340. The editing module 310 then retrieves the content and makes the indicated changes. For example, the editing module 310 updates the instance XML files stored at the SWAF database (DB) 380 and the VoiceSite's application DB 390 as a result of an editing operation initiated by the user.

Figure 4:
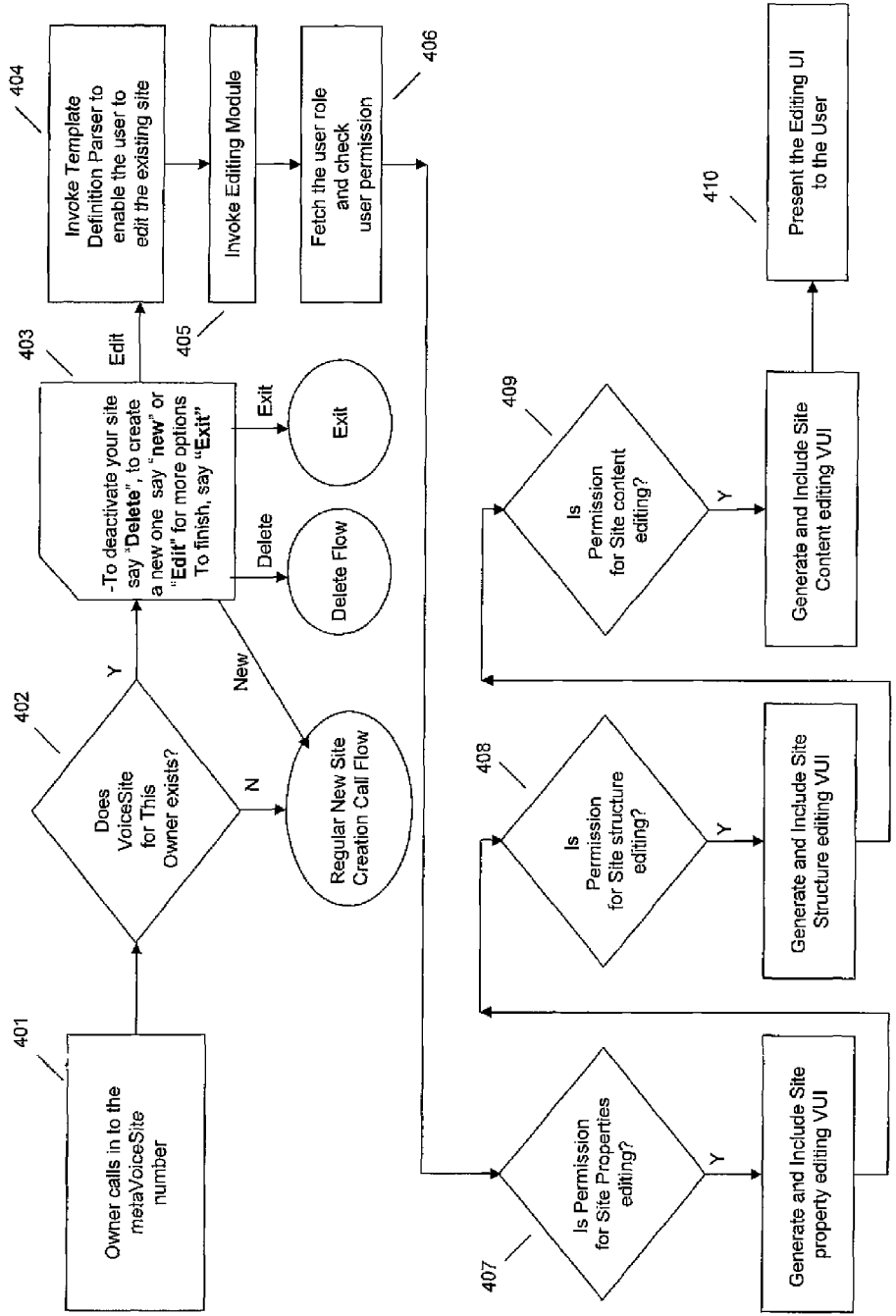
FIG. 4 illustrates an example of meta-VoiceSite editing.

Referring to FIG. 4, a meta-VoiceSite call flow is illustrated. A VoiceSite owner (user) calls into 401 the meta-VoiceSite number using his or her phone. At 402 a check is made to determine if a VoiceSite exists for this user. If not, the call can be directed to a new VoiceSite creation call flow. If the user has a VoiceSite, the user is given a series of choices via a voice prompt at 403. For example, the user may select from options including delete, new, edit, or exit. If the user chooses to exit, the call is ended, whereas if the user chooses to delete, the VoiceSite is deleted or deactivated. Assuming the user chooses the edit option, the template definition parser is invoked at 404 to enable the user to edit the VoiceSite. At 405 the editing module 310 is invoked. The user's role and permissions are fetched and checked at 406 in order to properly authenticate the user and make accessible the appropriate editing modules.

As described herein, the permissions may indicate that the user is permitted to conduct one or more of site properties editing 407, site structure editing 408, and site content editing 409. Depending on determinations made regarding permissions in steps 407-409, the VUI will include appropriate editing options from which the user may select. For site properties editing, the system generates and includes a site property editing portion of the VUI. Likewise, for site structure editing and site content editing, the system generates and includes editing options within the VUI for these functions. When the VUI has been compiled, it is presented 410 to the user over the voice channel.

Figure 5:
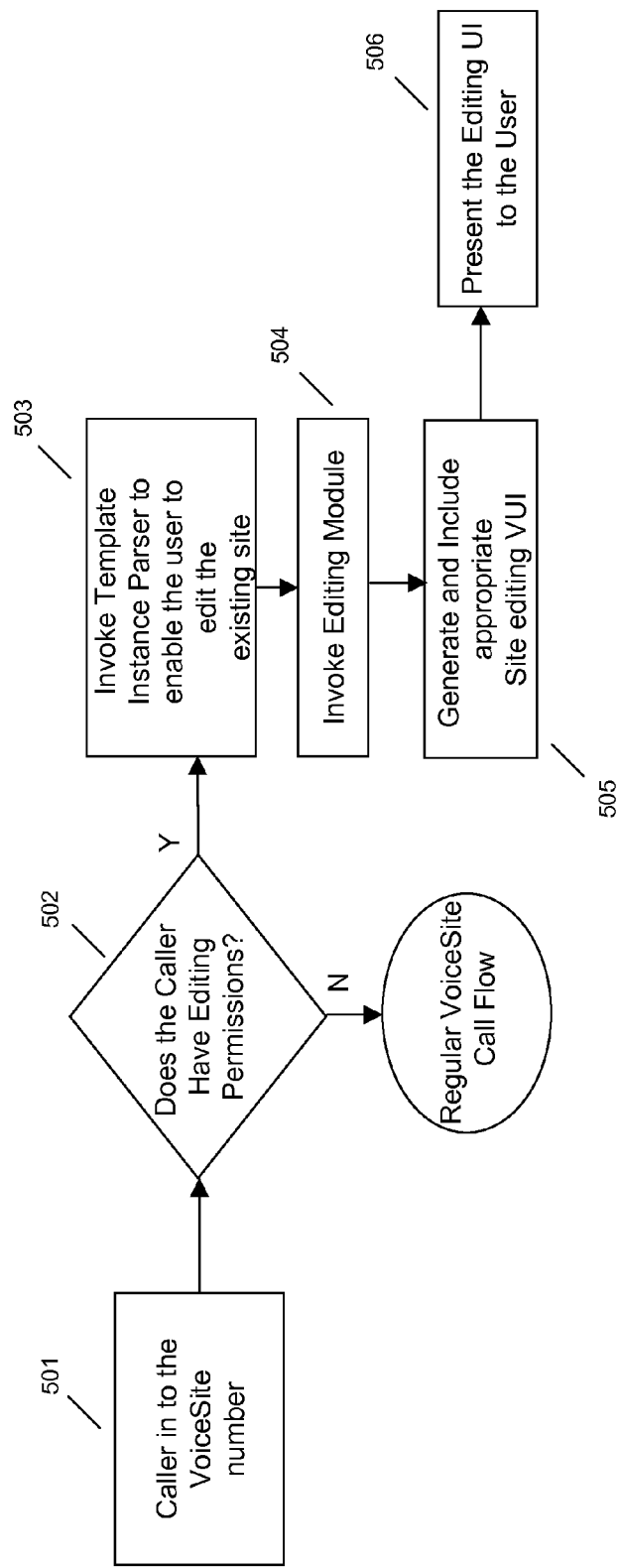
FIG. 5 illustrates an example of running VoiceSite editing.

Referring to FIG. 5, a running instance VoiceSite editing call flow is illustrated. At 501, an end user calls the VoiceSite number. At 502 it is determined if the caller has editing permissions for this VoiceSite. If no, the caller is directed to a regular interaction with the VoiceSite. For example, the caller may browse the audio content and navigate within the VoiceSite.

If it is determined at 502 that the user has editing permissions, the template instance parser is invoked at 503 and the caller is enabled to edit the existing VoiceSite. The editing module 110 is invoked at 504 and the appropriate VUI is generated given the determined permissions for the caller at 505. Once the appropriate VUI options have been ascertained, the VUI is presented to the user for editing at 506.

Figure 6:
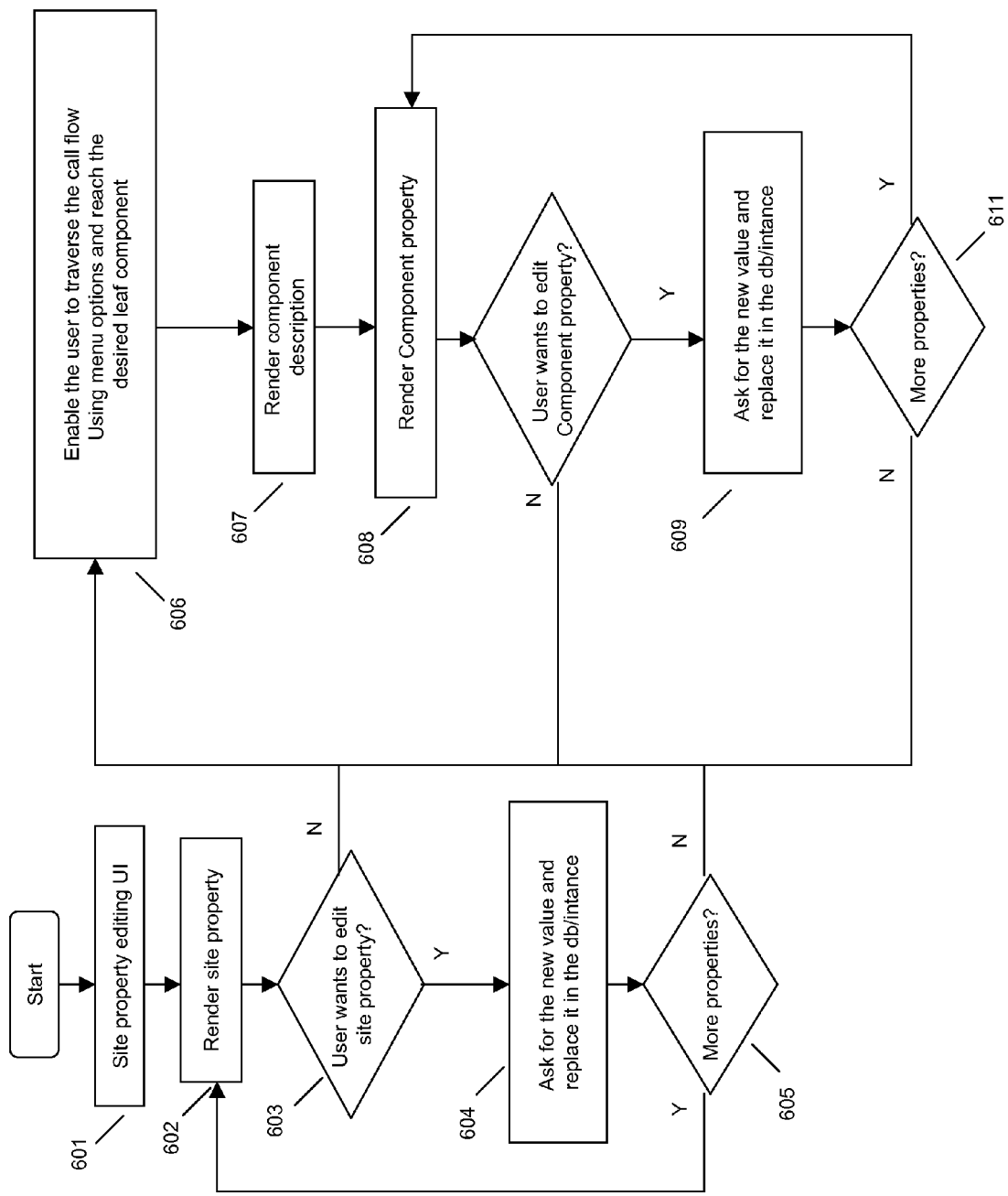
FIG. 6 illustrates an example of VoiceSite property and VoiceSite component property editing.

Referring to FIG. 6, an example flow of VoiceSite property editing is illustrated. In this non-limiting example, both VoiceSite property editing and VoiceSite component property editing are described.

When a call is received, the user is authenticated and property permissions are ascertained, and the site property editing VUI is presented to the user at 601. Responsive to a selection indicating that the user wishes to edit one or more properties, the VoiceSite properties are rendered to the user at 602, for example by making an audible rendering of current VoiceSite properties. This enables the user to be apprised of the current VoiceSite properties. At 603 it is ascertained if the user wants to edit the site properties. For example, the user can provide voice or Dual Tone Multi-Frequency (DTMF) input responsive to a prompt asking about editing the VoiceSite properties. If the user wants to edit the VoiceSite properties, the system prompts the user for a new value for a current property using the VUI. If there are no more site properties the user wants to edit, the process proceeds to step 606.

If the user did not want to edit the VoiceSite properties or if the user has finished editing VoiceSite properties, at 606 the user is allowed to traverse the call flow for the VoiceSite using VUI menu options to reach the component for which the user wishes to edit properties. At 606, the component description is rendered, which apprises the user of the component's current properties 607. If the user wants to edit the component's properties, the system prompts the user for a new component property value at 610. If the user is finished editing component properties, the call ends. Otherwise, the user can navigate through other components to edit their properties. Of course, the user can choose to end an editing session at any time by selecting an end option.

Table 1 includes some example editing APIs.

TABLE I

Editing API:

| Content Editing Interface | Component Properties Interface | Structure Editing Interface | API to enable/disable editing capabilities |
|---|---|---|---|
| AddContent( ) DeleteContent( ) | EditProperty( ) | AddComponent( ) ActivateComponent( ) (activate present but inactive components) | ExposeEditInterface( ) HideEditInterface( ) |
| EditContent( ) | | De-activateComponent( ) (disable component rather than delete) | |
| Re-describeContent( ) | | RemoveComponent( ) MoveComponent( ) (moves component within the application) | |

While the above description has focused on editing of VoiceSites, it should be understood that the editing modules described above are equally applicable to web site editing over a voice channel (that is, using the VUI). In the case of web sites that are generated based upon the Spoken Web Application Framework (SWAF) schema (such Websites are generated in a similar fashion as the equivalent VoiceSites described above), the mechanism to edit such SWAF generated web sites is essentially the same as for SWAF generated VoiceSites. For other web sites, not based upon SWAF schema, specific parsers are needed to work with the editing interface available for those web sites (but the procedure remains the same). With respect to the APIs, these are self-explanatory and need not be explained further. Also, the APIs listed above are merely representative examples, and in other embodiments, a developer may choose to incorporate more fine-grained or less-grained APIs.

Figure 7:
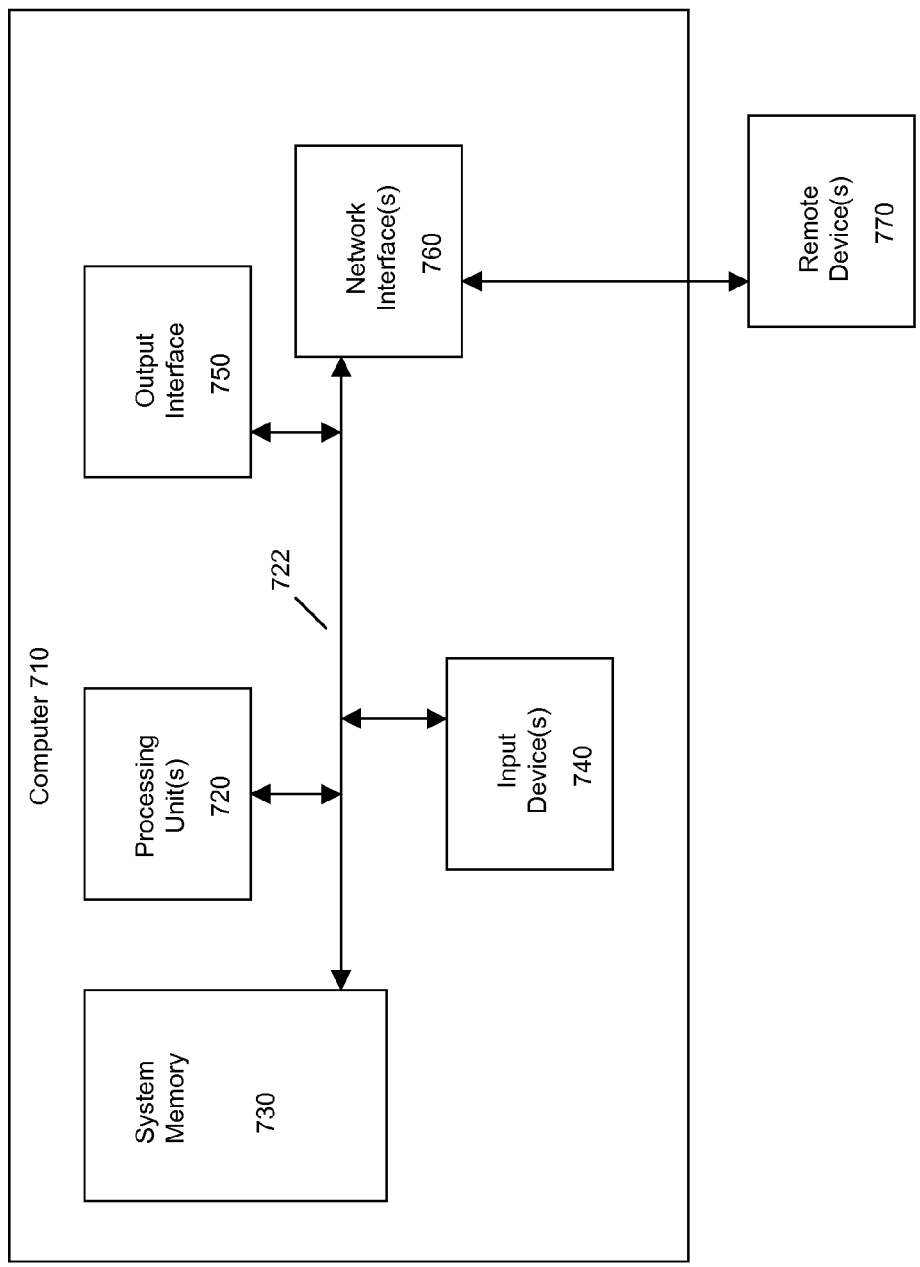
FIG. 7 illustrates an example computer system.

Referring to FIG. 7, it will be readily understood that certain embodiments can be implemented using any of a wide variety of devices or combinations of devices. An example device that may be used in implementing one or more embodiments includes a computing device in the form of a computer 710. In this regard, the computer 710 may execute program instructions configured to create a VoiceSite, permit access to a running instance of a VoiceSite or a meta-VoiceSite, provide a voice interface for editing the VoiceSite or meta-VoiceSite, and perform other functionality of the embodiments, as described herein.

Components of computer 710 may include, but are not limited to, a processing unit 720, a system memory 730, and a system bus 722 that couples various system components including the system memory 730 to the processing unit 720. The computer 710 may include or have access to a variety of computer readable media. The system memory 730 may include computer readable storage media in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 710 through input devices 740. A monitor or other type of device can also be connected to the system bus 722 via an interface, such as an output interface 750. In addition to a monitor, computers may also include other peripheral output devices. The computer 710 may operate in a networked or distributed environment using logical connections to one or more other remote computers or databases. The logical connections may include a network, such local area network (LAN) or a wide area network (WAN), but may also include other networks/buses, including telephony/voice channel connections.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product for editing telecom web applications through a voice-based editing interface comprising:
a computer readable storage medium having computer readable program code embodied therewith, the computer readable program code comprising:
computer readable program code configured to present a voice-based editing interface for a voice-driven telecom web application to a user over a voice channel, the voice-driven telecom web application comprising a voice-driven site, the voice-driven site being accessible and navigable via voice and comprising navigable audio content;
computer readable program code configured to dynamically generate the voice-based editing interface for a user responsive to at least one user voice input; and
computer readable program code configured to modify at least one aspect of the voice-driven telecom web site responsive to at least one user voice input to the voice-based editing interface;
the voice-based editing interface comprising at least one editing module selectable by a user to modify at least one aspect of the voice-driven site, the at least one editing module comprising at least two of: a site structure editing module which enables changing a call flow of the voice-driven site, a site content editing module which enables editing of content posted on the voice-driven site, and a properties editing module which enables reconfiguration of properties associated with the voice-driven site.

2. The computer program product according to claim 1, wherein to dynamically generate the voice-based editing interface for a user responsive to at least one user input further comprises:
identifying the user;
ascertaining at least one permissions for the user; and
activating at least one component of the voice-based editing interface responsive to ascertaining the at least one permission for the user.

3. The computer program product according to claim 2, wherein the at least one component comprises at least one of the site structure editing module, the site content editing module, and the properties editing module.

4. The computer program product according to claim 3, wherein:
the site structure editing module performs site VoiLink modifications;
the site content editing module performs audio content modifications; and
the properties editing module performs properties modifications for at least one VoiceSite.

5. The computer program product according to claim 1, wherein the voice-based editing interface for a telecom web application permits editing of all editable components of the telecom web application.

6. The computer program product according to claim 1, wherein the at least one user voice input comprises at least one of speech input and Dual Tone Multi-Frequency input.

7. The computer program product according to claim 1, wherein the voice-based editing interface is accessible via at least one of a public switched telephone network, a cellular network, and an Internet protocol network.

8. The computer program product according to claim 1, wherein the telecom web application is at least one of a VoiceSite created using a Spoken Web Application Framework schema and a web site created using a Spoken Web Application Framework schema.

9. The computer program product according to claim 8, wherein:
the VoiceSite is comprised of a plurality of VoicePages;
the VoicePages include at least one VoiceXML file;
the VoiceSite is hosted on a server within the telecom network; and
the at least one user editing input is input via a multimodal channel.

10. A system for editing telecom web applications through a voice-based editing interface comprising:
at least one processor; and
a memory operatively connected to the at least one processor;
wherein, responsive to execution of computer readable program code accessible to the at least one processor, the at least one processor is configured to:
present a voice-based editing interface for a voice-driven telecom web application to a user over a voice channel, the voice-driven telecom web application comprising a voice-driven site, the voice-driven site being accessible and navigable via voice and comprising navigable audio content;
dynamically generate the voice-based editing interface for a user responsive to at least one user voice input; and
modify at least one aspect of the voice-driven telecom web site responsive to at least one user voice input to the voice-based editing interface;
the voice-based editing interface comprising at least one editing module selectable by a user to modify at least one aspect of the voice-driven site, the at least one editing module comprising at least two of: a site structure editing module which enables changing a call flow of the voice-driven site, a site content editing module which enables editing of content posted on the voice-driven site, and a properties editing module which enables reconfiguration of properties associated with the voice-driven site.

* * * * *